(No Model.)

G. H. HERBERT.
STRAINER FOR AIR BRAKE HOSE COUPLINGS.

No. 572,009. Patented Nov. 24, 1896.

Witnesses.
A. M. Poynton
O. S. Doyle

Inventor
George H. Herbert,
By his Attorneys,
C. A. Snow & Co.

UNITED STATES PATENT OFFICE.

GEORGE HENRY HERBERT, OF ANACONDA, MONTANA.

STRAINER FOR AIR-BRAKE HOSE-COUPLINGS.

SPECIFICATION forming part of Letters Patent No. 572,009, dated November 24, 1896.

Application filed May 4, 1896. Serial No. 590,196. (No model.)

*To all whom it may concern:*

Be it known that I, GEORGE HENRY HERBERT, a citizen of the United States, residing at Anaconda, in the county of Deer Lodge and State of Montana, have invented a new and useful Strainer for Air-Brake Hose-Couplings, of which the following is a specification.

My invention relates to a straining device for use in connection with air-brake hose-couplings, the same being designed to exclude dust, cinders, and other obstructions, particularly when the members of the coupling between contiguous air-brake hose-sections are disconnected.

Further objects and advantages of this invention will appear in the following description, and the novel features thereof will be particularly pointed out in the appended claims.

Figure 1:
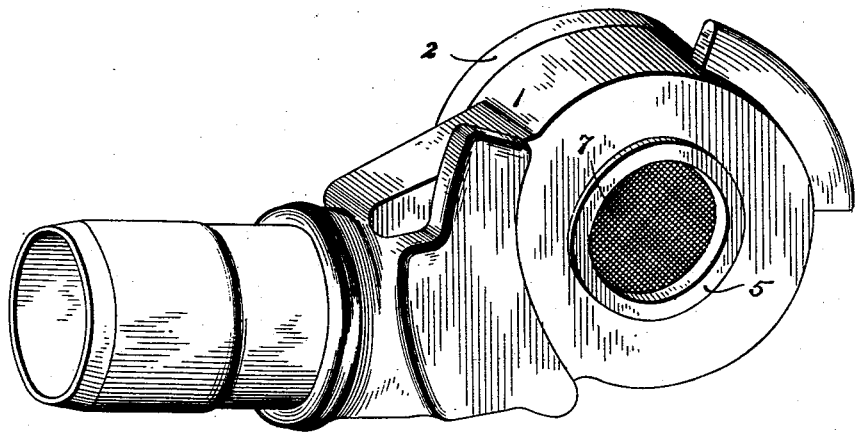
Figure 2:
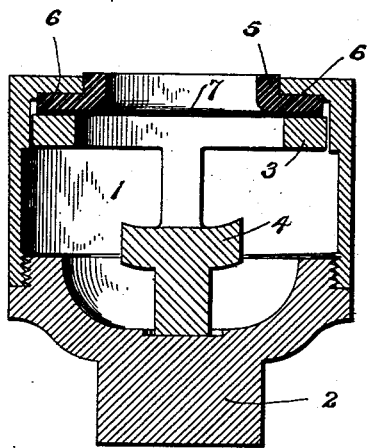

In the drawings, Figure 1 is a perspective view of a hose-coupling member provided with a straining device constructed in accordance with my invention. Fig. 2 is a transverse section of the head of the coupling, showing the strainer in operative position.

Similar numerals of reference indicate corresponding parts in all the figures of the drawings.

My invention is adapted for use in connection with the ordinary form of hose-coupling used in connecting the hose-sections at contiguous ends of cars, the same being provided with a barrel or head portion 1, fitted with a removable screw-cap 2, of which the ring 3, supported by the spider 4, is employed to secure a flanged gasket 5 in contact with a seat 6. This gasket projects outwardly to the face of the coupling-head for contact with the face of the other member of the coupling.

Interposed between the ring 3 and the contiguous portion of the gasket is a wire-gauze disk 7, which thus covers the opening in the head and prevents the entrance of dust, cinders, and other material liable to choke the train-pipe and interfere with the operation of the air-brake mechanism by gaining access to the valves and other working parts. This strainer does not interfere with the passage of air and does not render inoperative the packing, consisting of a gasket, which is employed to prevent leakage. The screen is embedded by the pressure of the ring in the lateral flange of the gasket, whereby the contact between the parts is as efficient as when the strainer is not in use.

An important advantage of the improved strainer, aside from its simplicity, resides in the fact that it is arranged contiguous to and approximately in the plane of the face of the coupling, whereby no lodgment is provided for dust or cinders. Furthermore, the gasket, which is employed in the ordinary construction to insure a tight joint between the members of the hose-coupling and which for that purpose is placed with one of its surfaces contiguous to the face of said member, is utilized to form a yielding seat for the strainer, and in order to adapt it to perform this dual function the gasket is made cross-sectionally angular or L-shaped, as shown clearly in Fig. 2, with the longer arm of the L in contact with the inner face of the coupling member to form a seat for the strainer. This arrangement provides for the employment of the strainer, as described, without in any way interfering with the usual functions of the coupling member.

Various changes in the form, proportion, and the minor details of construction may be resorted to without departing from the spirit or sacrificing any of the advantages of this invention.

Having described my invention, what I claim is—

1. The combination with an air-brake hose-coupling member, and a gasket arranged in the opening thereof and held in place by a removable cap, of a strainer arranged wholly in rear of the face of the coupling member and consisting of a reticulated disk seated upon the inner end of said gasket and embedded therein by the cap whereby dust is excluded when the coupling member is disconnected, said gasket forming a yielding seat for the strainer, substantially as specified.

2. The combination with an air-brake hose-coupling member, of a cross-sectionally-angular or L-shaped gasket arranged in the opening with its short arm projecting forwardly to the exterior face of the member and its longer arm in contact with the inner face at the front end of the cavity in the member, and a strainer consisting of a reticulated disk seated upon the inner surface of the longer arm of the gasket and between the gasket and the removable cap which forms a part of the coupling member whereby the strainer
5 is embedded in the gasket, and dust is excluded when the coupling member is disconnected, substantially as specified.

In testimony that I claim the foregoing as my own I have hereto affixed my signature in the presence of two witnesses.

GEORGE HENRY HERBERT.

Witnesses:
  JOHN A. HOGE,
  SIG GOODFRIEND.